Sept. 22, 1931.    W. M. CADY    1,824,034
AUTOMOTIVE BRAKE
Filed March 6, 1929
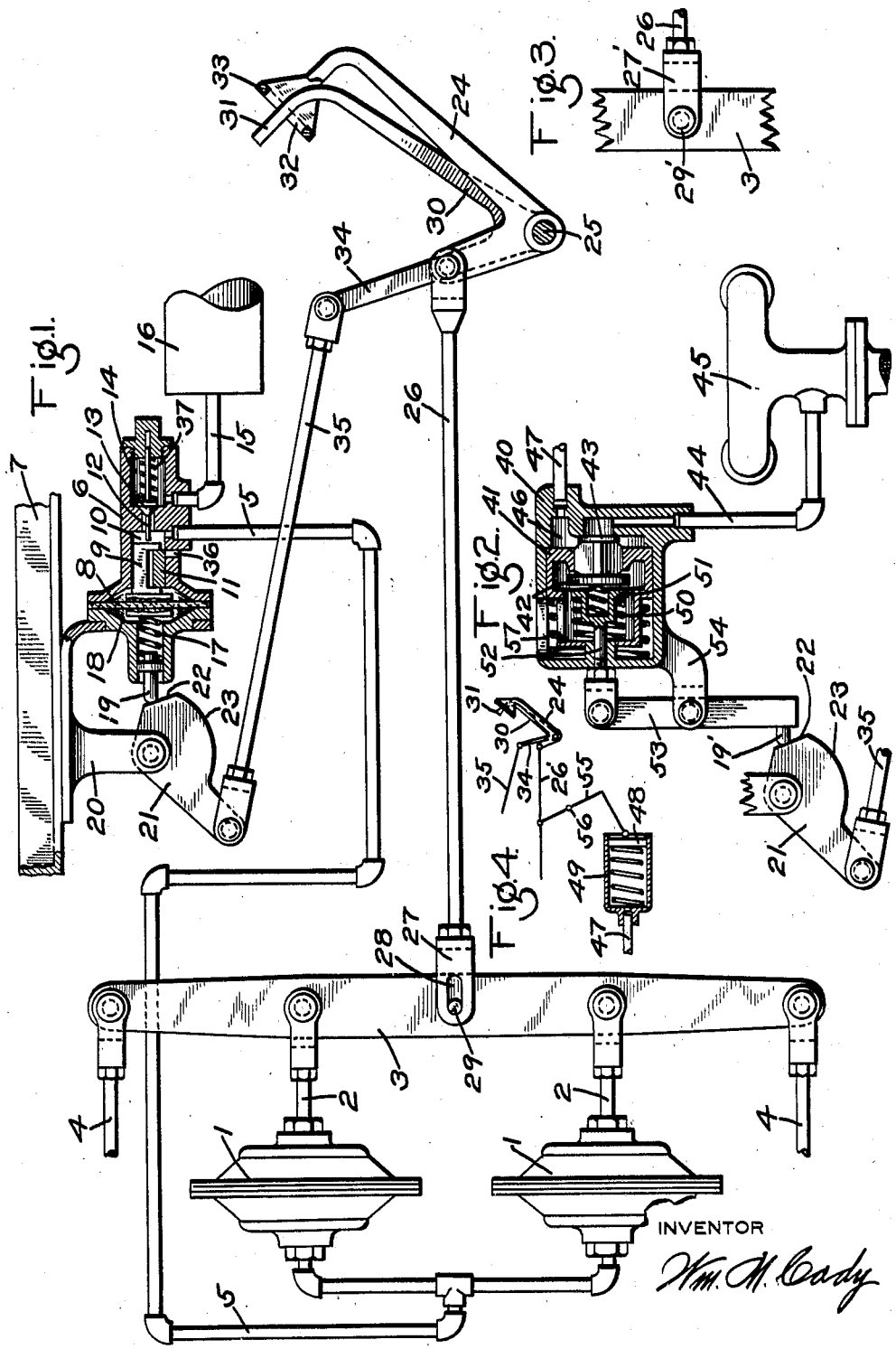
INVENTOR
Wm. M. Cady Patented Sept. 22, 1931

1,824,034

UNITED STATES PATENT OFFICE

WILLIAM M. CADY, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AUTOMOTIVE BRAKE

Application filed March 6, 1929. Serial No. 344,817.

This invention relates to brakes, and more particularly to a fluid pressure brake for motor vehicles.

The principal object of my invention is to provide an automotive brake in which movement of a member by the operator's foot effects the operation of the brakes by fluid pressure and in which further movement of the operator's foot is adapted to actuate a pedal for applying the brakes mechanically by foot power.

In the accompanying drawings, Figure 1 is a diagrammatic view of a brake equipment embodying my invention; Fig. 2 a view showing an application of my invention in connection with a so called vacuum or sub-atmospheric fluid pressure brake; Fig. 3 a detail view showing a slight modification of one of the features shown in Fig. 1; and Fig. 4 a diagrammatic view of the braking apparatus employed with the Fig. 2 construction.

The equipment shown in Fig. 1 comprises the usual brake chambers 1 having rods 2 connected to a brake beam 3. The brake beam 3 is connected to rods 4 through which the usual braking members (not shown) are operated to apply the brakes.

The fluid pressure for operating the brakes is supplied to and released from the brake chambers 1 through a pipe 5, which is connected to a valve device 6, suitably secured to the car framing 7. The valve device 6 may comprise a casing in which is mounted a flexible diaphragm 8 adapted to operate a stem 9 contained in valve chamber 10 at one side of the diaphragm.

A release valve 11 is operable by said stem for controlling the exhaust of fluid from chamber 10 and pipe 5 and said stem is also adapted to engage the stem 12 of a supply valve 13, contained in valve chamber 14. The valve chamber 14 is connected by a pipe 15 to a reservoir 16 which is adapted to be maintained charged with fluid under pressure.

A coil spring 17, mounted in diaphragm chamber 18, engages the diaphragm 8 and a movable stem 19 engages the opposite end of the spring. Pivotally mounted on a bracket member 20 is a cam 21, having a cam face 22 adapted to engage the stem 19, so that counter-clockwise movement of the cam causes the cam face 22 to depress the stem 19 and thereby compress the spring 17.

The extent of the cam face 22 is such that the spring 17 may be compressed to a desired maximum degree and then further rotative movement of the cam causes the stem 19 to engage a surface 23 of the cam, which is concentric with the axis of rotation, so that this further rotative movement of the cam has no effect on the stem 19.

A pedal lever 24 is mounted on a shaft 25 for convenient operation by the operator and said lever is pivotally connected to a rod 26. A yoke 27 is secured to the outer end of the rod 26 and is provided with elongated lost motion slots 28 in which engages a pin 29, secured to the beam 3.

Mounted on the shaft 25 is a foot operable lever 30, preferably so disposed that its foot operable end 31 extends through an opening 32 in the foot pad 33 of the pedal lever 24. The arm 34 of the lever 30 is pivotally connected to one end of a rod 35, the other end of said rod being pivotally connected to the cam 21.

In operation, if it is desired to apply the brakes the portion 31 of the lever 30 is depressed by the foot of the operator an amount dependent upon the degree of braking power desired and the cam 21 is then rotated in a counter-clockwise direction to a corresponding extent. The cam face 22 then operates to move the stem 19 inwardly, so as to compress the spring 17 a certain amount.

The pressure of spring 17 then operates to deflect the diaphragm 8 toward the right, thus moving the release valve 11 to the right to close the exhaust port 36 and then causing the stem 9 to engage the stem 12, so as to unseat the valve 13. Fluid under pressure is then supplied from valve chamber 14 and the reservoir 16 to chamber 10 and thence flows to pipe 5 and the brake chambers 1. The rods 2 are then moved toward the right by fluid under pressure supplied to the brake chambers, so that the brake beam 3 is operated to actuate the brake rods 4 and thus effect an application of the brakes.

The pressure of fluid supplied to valve chamber 10 and the brake chambers 1 increases, until the fluid pressure acting on the diaphragm 8 in chamber 10 slightly exceeds the pressure of spring 17, when the diaphragm 8 will be shifted to the left sufficiently to permit the closure of the supply valve 13 by the spring 37, but without moving the release valve 11 sufficiently to open the exhaust port 36.

If it is desired to apply the brakes with greater force, the portion 31 is further depressed by the foot of the operator, so as to effect the further compression of spring 17, and thereby the diaphragm 8 is again deflected toward the right, so as to again unseat the valve 13 and permit further flow of fluid under pressure to the brake chambers.

As the brakes are applied, the brake beam 3 is moved toward the right and with it, the pin 29, but due to the lost motion provided by the slots 28, the rod 26 is not shifted and it will be seen that normally, the brakes are controlled by operation of the lever 30 independently of and without any movement of the pedal lever 24.

If, however, for any reason, a failure of fluid pressure should occur, so that the brakes are not applied by fluid pressure upon depression of the member 31, then by moving the foot further than normally, the pedal 33 will be engaged by the foot of the operator and then the pedal lever 24 will be operated to shift the brake beam 3 toward the right and thus cause the brakes to be applied mechanically by direct foot power.

Instead of having the lost motion slots 28, the yoke 27' may be connected to the pin 29' as shown in Fig. 3, in which case, as the brakes are applied by fluid pressure, the movement of the brake beam 3 toward the right will also cause movement of the rod 26 toward the right, so that the pedal 33 will then move away from the foot of the operator as the brakes are applied. With the last mentioned construction, the portion 31 need not extend above the pedal 33 to the extent shown in Fig. 1, since as the portion 31 is depressed and the brakes are applied by fluid pressure, further movement of the portion 31 will be permitted by reason of the movement of the pedal 33 away from the foot of the operator.

As in the Fig. 1 construction, if the fluid pressure brake fails to function, then the movement of the foot will cause the pedal 33 to be engaged and operated to apply the brakes by manual power.

The Fig. 1 construction illustrates an application of my invention to a fluid pressure brake employing fluid pressure above atmospheric pressure. In Fig. 2 is shown a valve device for controlling a vacuum or sub-atmospheric fluid pressure brake and comprising a casing 40 containing a sleeve piston 41 having an end wall provided with a seat for an atmospheric valve 42. The valve 42 is connected to a vacuum controlling valve 43, which controls communication through pipe 44 from the intake manifold 45 of an internal combustion engine to a chamber 46 which is connected by a pipe 47 with one side of a power applying piston 48, contained in a brake cylinder 49.

A spring 50 engages an outer end wall of the piston 41 and pressure is applied to the spring through a member 51 which engages the opposite end of the spring and which is connected to a stem 52. The stem 52 is pivotally connected to one end of a lever 53, which is pivotally fulcrumed on a bracket arm 54 and which carries at its opposite end a pin 19' adapted to engage the cam 21 similar to the cam employed in the Fig. 1 construction.

The pedal levers and connections are the same as shown in the Fig. 1 construction, as indicated in Fig. 4. The rod 26' is operatively connected to the usual braking members and is also connected to a lever 55 fulcrumed at 56 and having one end operatively connected to the piston 48.

When the end portion 31 of the foot operated lever 30 is depressed, the rod 35 is operated to rock the cam 21 and thus cause the cam face 22 to shift the pin 19' toward the right. The lever 53 is then operated to pull the stem 52 toward the left, so that pressure is transmitted through the spring 50 to the piston 41, which is then moved toward the left against the resistance of spring 57.

By this movement, the valve 42 is first permitted to seat and then the valve 43 is unseated, so that the chamber 46 is connected to the intake manifold 45 and a partial vacuum is thus created in said chamber and, through pipe 47, in the brake cylinder 49.

The piston 48 is then moved toward the left by atmospheric pressure acting on the right hand side of the piston, and power is transmitted through the lever 55 to the rod 26', so as to apply the brakes.

When the degree of vacuum created in the chamber 46 reaches a certain point, the atmospheric pressure and the pressure of spring 57 operate to move the piston 41 toward the right until the valve 43 is seated. A higher vacuum may be created in the brake cylinder by further depressing the portion 31, so as to again effect the movement of piston 41 toward the left.

If the vacuum brake should fail to function, then the pedal lever 24 may be operated by the foot of the operator, and thereby, as in the Fig. 1 construction, the brakes will be applied by direct manual power, through the operation of the rod 26'.

While two illustrative embodiments of the invention have been described in detail, it is not my intention to limit its scope to these embodiments or otherwise than by the terms of the appended claim.

Having now described my invention, what I claim as new and desire to secure by Letters Patent, is:—

In an automotive brake system, the combination with a fluid pressure brake including controlling valve means, of a foot operated lever mechanically connected to operate the brakes by foot power, a foot operated lever having a movement relative to the mechanical foot lever for operating said valve means, the mechanical foot lever being arranged to be operated by the continued movement of the foot in operating the levers which controls the valve means, a substantially rigid operating connection between said valve means and said foot operated lever, and means associated with said connection for preventing further movement of said valve means upon movement of the foot operated lever with said mechanical foot lever.

In testimony whereof I have hereunto set my hand, this 28th day of February, 1929.

WILLIAM M. CADY.